(12) United States Patent
Swan

(10) Patent No.: US 12,382,950 B1
(45) Date of Patent: Aug. 12, 2025

(54) DATA CAPTURE METHOD FOR ANIMAL MOVEMENT AND PREDICTION

(71) Applicant: MT TECHNOLOGIES, LLC, Green Bay, WI (US)

(72) Inventor: Michael W. Swan, Green Bay, WI (US)

(73) Assignee: MT TECHNOLOGIES, LLC, Green Bay, WI (US)

(*) Notice: Subject to any disclaimer, the term of this patent is extended or adjusted under 35 U.S.C. 154(b) by 0 days.

(21) Appl. No.: 18/730,704

(22) PCT Filed: Jan. 19, 2024

(86) PCT No.: PCT/US2024/012103
§ 371 (c)(1),
(2) Date: Jul. 19, 2024

(87) PCT Pub. No.: WO2024/155866
PCT Pub. Date: Jul. 25, 2024

Related U.S. Application Data (60) Provisional application No. 63/440,230, filed on Jan. 20, 2023.

(51) Int. Cl.
*A01M 31/00* (2006.01)
*G06V 40/10* (2022.01)
*H04W 4/38* (2018.01)

(52) U.S. Cl.
CPC .......... *A01M 31/002* (2013.01); *G06V 40/10* (2022.01); *H04W 4/38* (2018.02)

(58) Field of Classification Search
CPC ....... A01M 31/002; G06V 40/10; H04W 4/38
See application file for complete search history.

(56) References Cited

U.S. PATENT DOCUMENTS

| 2,663,282 | A | 12/1953 | Ingle |
| 3,100,473 | A | 8/1963 | Kissel |
| 3,100,476 | A | 8/1963 | Peak |
| 3,304,911 | A | 2/1967 | Hiroshi et al. |

(Continued)

FOREIGN PATENT DOCUMENTS

| RU | 2722511 C1 | 6/2020 |
| WO | 2024155866 A1 | 7/2024 |

OTHER PUBLICATIONS

International Search Report and Written Opinion for Application No. PCT/US2024/012103 dated Jun. 3, 2024 (14 pages).

(Continued)

*Primary Examiner* — James J Yang
(74) *Attorney, Agent, or Firm* — Michael Best & Friedrich LLP (57) ABSTRACT

A mapping system for tracking game within a property. The mapping system includes a plurality of devices and a system of servers. The plurality of devices is configured to provide records of game. Each of the records includes data. The system of servers is configured to receive the records of game from the devices and create an event for each record. Each event is assigned location information that is specific to the device that supplied the record. The system of servers includes a processor configured to predict a likelihood of a game sighting at a specific time and location within the property based on a plurality of events.

7 Claims, 8 Drawing Sheets

(56) References Cited

U.S. PATENT DOCUMENTS

| | | | |
|---|---|---|---|
| 5,514,201 | A | 5/1996 | Marijuan De et al. |
| 7,079,027 | B2 | 7/2006 | Wojcik |
| 7,319,383 | B2 | 1/2008 | Howard |
| 8,085,309 | B1 | 12/2011 | Kelliher |
| 9,706,756 | B2 | 7/2017 | Swan |
| 10,257,651 | B1 | 4/2019 | Thompson |
| 2002/0057340 | A1 | 5/2002 | Fernandez et al. |
| 2011/0102154 | A1 | 5/2011 | Hindhede |
| 2012/0085288 | A1 | 4/2012 | Salinas et al. |
| 2014/0122352 | A1 | 5/2014 | Gleim et al. |
| 2014/0129075 | A1 | 5/2014 | Carleton |
| 2014/0200961 | A1 | 7/2014 | Folks et al. |
| 2015/0069118 | A1 | 3/2015 | Roys |
| 2017/0311574 | A1* | 11/2017 | Swan ................ G06V 40/10 |
| 2023/0217902 | A1* | 7/2023 | Finatti ............ A01K 29/005 340/573.3 |

OTHER PUBLICATIONS

Zerotohunt, "Deer Sign Guide | How to Scout for Deer", Web Blog Post, Jan. 16, 2019, retrieved on [Mar. 26, 2024]. Retrieved from the internet <URL: https://www.zerotohunt.com/deer-sign-guide-how-to-scout-for-deer/> entire document (19 pages).

\* cited by examiner

DATA CAPTURE METHOD FOR ANIMAL MOVEMENT AND PREDICTION

CROSS-REFERENCE TO RELATED APPLICATION

This application claims priority to U.S. Provisional Patent Application No. 63/440,230, filed on Jan. 20, 2023, the entire contents of which are incorporated herein by reference.

FIELD OF THE INVENTION

The present invention relates to an animal tracking system, and, more particularly, to a deer movement analysis system.

BACKGROUND

Deer hunters need to know not only where the game travels but also its traveling habits in regard to time. While some game may be stalked, the hunter, particularly if using limited range weapons such as a bow and arrow, generally has to wait for the game to come to him.

An effective method of hunting deer is to take a somewhat hidden position, generally elevated in a tree, along a path known to be traveled by the deer. The deer hunter takes a position ten or twenty feet in the air, but even with the best equipment, it is not pleasant to resist the coldest weather for more than a few hours. Additionally the hunter must remain substantially still for fear of being seen by the deer. Often the sport can be unrewarding unless the hunter's timing is right.

It is important that hunters not only know where the deer pass, but also at what time of the day they pass a particular location. The timing of the hunter depended upon mere guesswork or clues located along the trail. Deer are creatures of habit and tend to follow the same trail at approximately the same time each day. If the deer started their day close to the tree stand, it might pass there early in the morning. Conversely, if the deer started very far from this tree stand, it might not arrive there until evening.

The difficulties described above with respect to hunting deer are typical problems encountered with other game as well. The signs at the location will readily tell the hunter what type of animal passed that point.

In addition, it is of great interest to naturalists to study the habits of animals. While devices have been developed for studying animals in captivity, there is a great need for devices to study the time related habits of animals in the wild. There is a particular need to provide devices which will not upset the natural habits of game, yet allow detailed and accurate study of their time related habits.

Devices to study animals have been developed, including U.S. Pat. No. 3,304,911, to Hiroshi Hakatta et al., which describes an apparatus for automatically measuring the movement of an animal, within a defined area using an electric eye system. U.S. Pat. No. 3,100,473 to J. W. Kissel, describes an apparatus for measuring animal activity within a movable, cylindrical container. U.S. Pat. No. 2,663,282 to Ingle, describes a fatigue machine for rats. None of the prior art described hereinabove satisfies the needs of determining the movement habits of animals in the wild.

SUMMARY OF THE INVENTION

The present invention provides a method and system for detecting the movement of animals and predicting their future movement dependent upon predicted environmental conditions.

Process Types
 Cellular or WiFi Trail Camera→Picture is sent to a database via cellular or WiFi
 Trail Camera→Picture is sent to a database via import from an SD card or other storage device
 Cellular or WiFi Sensor→Sensor event is sent to a database via cellular or WiFi
 Sensor→Sensor event is sent to a database via import from an SD card or other storage device
Data Gathering Process
 1) Picture or Event is received into a Database with at least the following data
  Picture or Event, Time, location (GPS), device battery level, device signal strength
  If the device has the ability include the direction of travel and animal type
 2) Add weather data to the transaction
  Query a weather service like Aeris or Accuweather to get basic weather data for the Location and Time of the transaction including but not limited to
   Temperature Wind Direction Wind Speed Barometric pressure
   Rain fall Etc.
 3) Add Location information from the property database like
  Location type: Crosstrail, swamp entrance, field entrance, scrape, rub, etc.
  Trail direction
  Device Properties
 4) Use image processing to determine
  Animal Species: Deer, fox, coon, dog, etc.
  Deer Type: Buck, Doe or fawn
  Direction of Travel
  Identify duplicate pictures
 5) Provide editing capability for the results of image processing
Analysis
 6) Predict future deer movements through statistical analysis and weather data
Probability and Frequency Graphs
 7) Analysis for the Property Owner by GPS (highly secured)
 8) Analysis for all database users by county, state or all Properties
 9) Sharing social media for users to discuss findings In one aspect, the disclosure provides a mapping system for tracking game within a property. The mapping system includes a plurality of devices and a system of servers. The plurality of devices is configured to provide records of game. Each of the records includes data. The system of servers is configured to receive the records of game from the devices and create an event for each record. Each event is assigned location information that is specific to the device that supplied the record. The system of servers includes a processor configured to predict a likelihood of a game sighting at a specific time and location within the property based on a plurality of events.

In another aspect, the disclosure provides a method for tracking game, via a mapping system, within a property. The property includes a plurality of devices at different location types within the property. Each of the devices is configured to provide records of game. The method includes providing a location table that has a predefined list of the location types present within the property, receiving a first user input and a second user input, inserting each device into the location table based on the first user input, assigning a location type to each of the devices in the location table based on the second user input, receiving records of game from each of the devices, creating an event for each record of game including data mined from the record of game, retrieving, from the location table, the location type assigned to the device that provided the record of game, assigning the retrieved location type to the event, and predicting a likelihood of a game sighting at a specific time and location within the property based on a plurality of events.

In another aspect, the disclosure provides a method for building a data structure from records of game provided by a plurality of devices. The records of game have data that includes a time that the record of game occurred. The method includes creating an event for each record of game, retrieving, from a location table, location information that corresponds to the device that provided the record, assigning the retrieved location information to the event, retrieving, from a weather service, weather data according to the location information assigned to the event and the time that the record of game occurred, and assigning the retrieved weather data to the event.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

Figure 1:
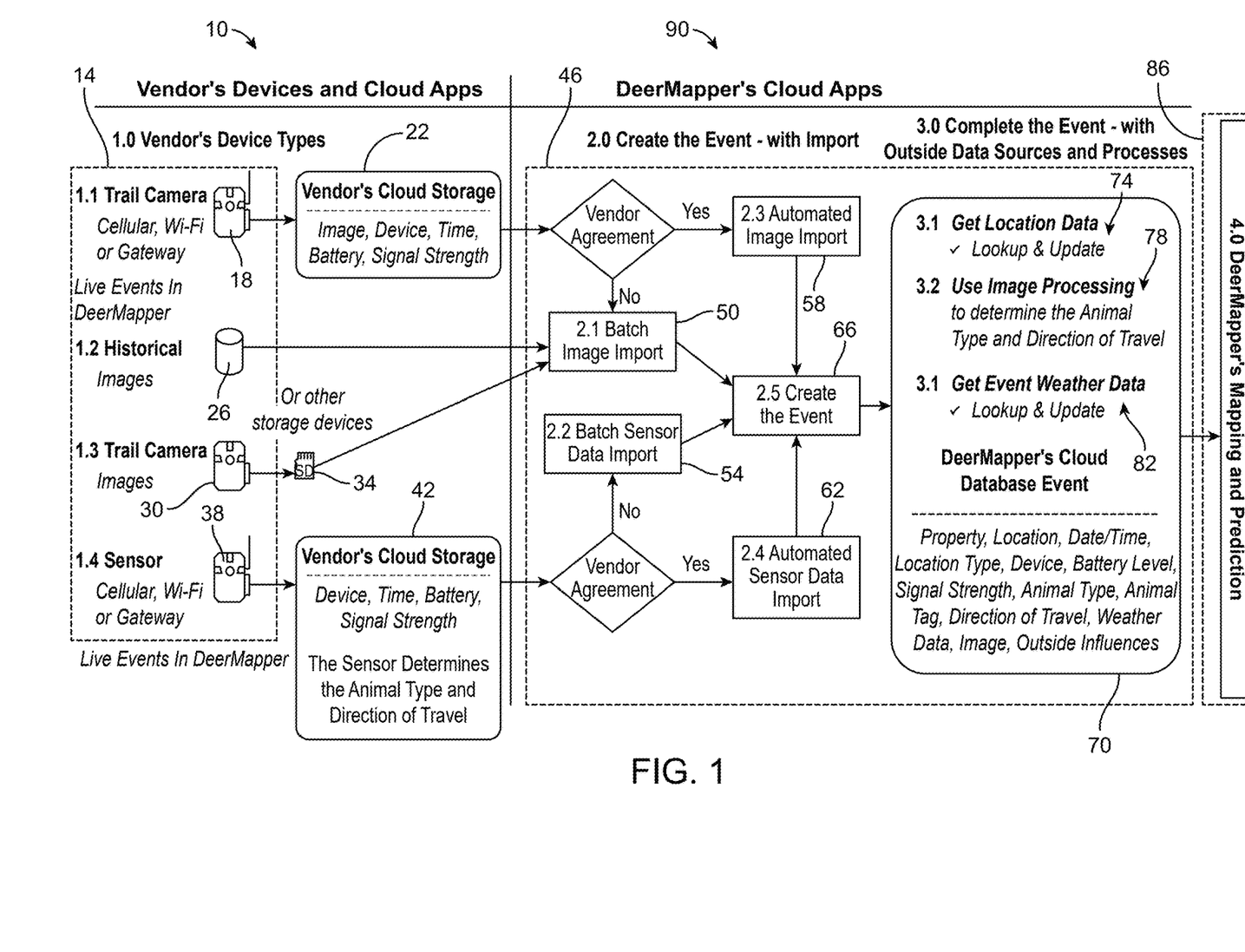
FIG. 1 is a schematical block diagram of an embodiment of the method of the present invention.

Referring now to the drawings, and more particularly to FIG. 1, there is shown an animal movement prediction system referred herein as the DeerMapper system 10.

Data Capture Method builds Events by mining data from multiple sources and processes. An Event in DeerMapper 10 is a row of data that maps and details the information that defines an animal movement. Events represent the central row structure of the DeerMapper 10 database.

An Event originates when an animal triggers a device 14. The device 14 will capture data in the form of a photo with meta data or just meta data about the Event.

The type of device 14 determines how the Event is built and populated into the DeerMapper database. Data Capture Method is compatible with all vendor device types defined in this document. Data Capture Method is required to build an Event whether using a single device type or multiple device types.

To complete an Event build requires several data sources and processes. Data Capture Method is illustrated in the FIG. 1 and detailed in the text below.

Vendor's Device Types

Data Capture Method has been tested for several years with all camera and sensor data capture device types. This testing demonstrated the most effective methods to gather information from differing devices 14 into one standard data type that can be shared in mapping and prediction of animal movements. The information may also be referred to as records of game.

These data types are organized into a data structure to represent fact not theory. The Events actually happened at the specified location and time. Empirical data, in multiple Events, each following data rules, provides truth in the predictive analysis.

If the user is only gathering photos of whitetail deer movements the theories of movement triggers can be skewed. An example is watching for deer movement after there is corn placed at the location. Deer will frequent that corn every evening and not take their normal trails. Data Capture Method will only be more precise as to arrival time because of the additional data types like outside influences. Theoretical predictions have no statistical value here.

Other outside influences like trail cameras provide another example. Studies have shown that mature deer avoid trail cameras on their regular movements. A method to avoid that is to mount the device 14 ten feet up in a tree using the pole mount. With the advancements in battery life this becomes the preference for Data Capture Method as long battery life and high in the tree reduces the skewed statistics of the deer avoiding the trail camera and patterning the human walking to the trail camera.

There are three principles in statistical analysis that Data Capture Method follows to assure accurate mapping and predictions.

First: The more Events the more accurate the statistical analysis. It is not possible to know where the animal came from or where it is headed nor why it is even there from a photo. But, many photos that have been converted to data can.

Second: To do statistical analysis and follow the principles of mathematics require well defined data types in a structured data base. These data types must follow the strict rules of a SQL structure to optimize the multiple queries and visuals required. A simple image file storage method, no matter how it is sorted and categorized, cannot accurately predict animal movements. Mathematically there are other variables required that are not available from a photo. Photos provide valuable information, but they are not defined data.

Third: To maximize the imported information requires it to be compatible with all device types. The advantage of Data Capture Method is that it accommodates varied device types each in the most efficient way possible. The user will have automated data capture whenever it is possible.

Data Capture Method converts all image formats automatically and does the conversion to store them in the most efficient data cloud and analysis format. Whether the photo is 2MP or 20MP does not matter for the import. All the data is converted to the same data types following the strict rules laid out in Data Capture Method. All Events are represented the same regardless how they were captured.

The only exception is a video format. It is not practical to convert this automatically because there will be hundreds of still poses in one file. The user will have to do a screenshot of the pose they prefer and save it as a JPG. These screen shots can then be imported as any other Photo.

Although not directly illustrated in the flowchart, Data Capture Method provides the user data entry of events for live sightings while scouting or shining in fields. Manual data entry contributes to the number of 'sightings' of animals but is not meant to build a sufficient number of events that form the basis of the prediction.

A typical 40 acre plot that has six trail cameras would average several thousand deer movement Events in a fall season. These can be fully automatic if they are from cellular trail cameras and sensors. This is the most effective use of Data Capture Method as it provides live data, costs less and takes little effort for the user.

Trail cameras provide photos of the deer but miss key information like direction of travel or animal type. Sensors can provide that data directly from the device. Trail cameras have not yet added that capability so the photo requires image processing done later to define that data. Data Capture Method mines Event data from multiple devices and processes to reach sufficient Event numbers for accurate analysis.

The following device types do not reference specific vendors but represent the ways they capture events and how Data Capture Method builds the Events into the DeerMapper database.

Trail Camera—Cellular, Wi-Fi or Gateway

Trail cameras 18 detect a passing animal then take a photo. This photo can be transmitted to a cloud storage facility 22 as an image in several ways.

The photo can be transmitted to cloud storage 22 via a cellular modem registered to a specific cellular service. It can also be transmitted via Wi-Fi when a camera 18 is close enough to a Wi-Fi source. Some photos are transmitted via a radio network to a gateway. This Gateway then can transmit either via cellular or Wi-Fi to the cloud storage 22. A gateway can also be a cellular camera.

Either method, these photos are now available on the Vendor's Cloud Storage 22 as images and meta data.

Historical—Images

Wildlife biologists have accumulated years of stored images. Millions of hunters each have thousands of stored images from previous years from their personal hunting properties. Each year 1.4 billion photos are taken then stored and ready for upload.

But, there isn't a method for them to import their images into a data structure. So this wealth of Event data is just stored and hidden.

These billions of images, stored on external storage devices 26, can easily be uploaded using Data Capture Method.

Trail Camera—Images

Traditional trail cameras 30 do not have cellular or Wi-Fi capability but store the photos on an external storage device, such as an SD Card 34. Some cameras 30 also can upload the photo via Bluetooth to a mobile device.

Either way, these images, stored on an external storage device 34, can easily be uploaded using Data Capture Method.

Sensor—Cellular, Wi-Fi or Gateway

Sensors 38 capture animal movements with several advantages. They are about one third the cost of a trail camera 18, 30. Predictions not only increase in accuracy with the number of events but also by the number of locations. Sensors 38 allow the user to collect data in three times the locations for the same cost. Our studies have shown the perfect ratio is three sensors 38 for each cellular camera 18. At a cross trail, sensors 38 can be placed on 3 of the trails to determine where the animal came from and where it is going.

Sensors 38 can also distinguish the size of the animal. This is valuable in deer hunting to be able to remove movements of fox, coyotes, coon and squirrels automatically. If Data Capture Method were not used these other small animals can dramatically skew the statistics.

Sensors 38 can also determine the direction of travel that is valuable in knowing where the deer came from and where they are going.

Sensors 38 that are placed in a radio network can reduce the cost of cellular accounts. Sensors 38 work well in radio because the packets are very small. Sensors 38 can take advantage of the benefits of IoT (Internet of Things). There can be 33,000 sensor events transmitted via cellular at the same cost as one photo.

Sensors 38 can provide more data that the current cameras 18, 30 cannot, like direction of travel and animal type. But, the Sensor 38 cannot provide a photo.

This illustrates the value of multiple device types and processes to provide mathematically accurate predictions.

Sensors 38 can work in all device transmission types including Cellular, Wi-Fi and Gateways providing sensor data available on the Vendor's Cloud Storage 42.

Create the Event—with Import 46

Import is the process of uploading an Image and/or meta data into the DeerMapper cloud to trigger the creation of the Event.

The import process will convert images to a standard file format most efficient for Predictions. Even if it begins with 2 MP or 20MP it will be converted to the standard format. Data Capture Method will use the most efficient format for image processing to gain additional data like direction of travel and animal type. The animal type data is invaluable to select the target animal and not have skewed types. When mapping deer other animals like fox, pigs, coyotes, raccoons and squirrels can skew data twenty to forty percent.

To be able to automate a trigger in a Vendor's Cloud Storage as soon as a new Image and/or meta data is stored there must be an agreement with the vendor. If the agreement is in place the Events are automatically created and are live for mapping and prediction. When the animal passes in front of the device and it is automatically uploaded to the Vendor's Cloud storage via Cellular, Wi-Fi or Gateway a trigger will then activate the DeerMapper upload.

If there is not an agreement the Images and/or meta data must be downloaded via the Vendor's application then uploaded into DeerMapper. Still, the most efficient process for that scenario.

Batch Image Import 50

Data Capture Method provides the user the ability to upload data images from multiple sources like SD cards, hard drives or cloud drives.

To do this the user first must specify the device the images came from. Each Devices is assigned a location so the system will automatically place the Images at that device/location.

Batch Sensor Data Import 54

Data Capture Method provides the user the ability to upload sensor data from multiple sources like SD cards, hard drives or cloud drives.

To do this the user first must specify the device the sensor data came from. Each Devices is assigned a location so the system will automatically place the sensor data at that device/location.

Automated Image Import 58

Data Capture Method automatically uploads the image from the Vendor's Cloud Storage device when triggered by a new Image. The device is part of the meta data for the image so the event is created and assigned to that device/location.

Automated Import Sensor Data 62

Data Capture Method automatically uploads the sensor data from the Vendor's Cloud Storage device when triggered by a new entry. The device is part of the sensor data so the event is created and assigned that device/location.

Create the Event 66

The Event is created as soon as the Image or Sensor data is received. If this was an automated import a notification is sent to the user's mobile device. This would be the same as live in that it would be seconds not minutes after the animal triggered the device. The image may take a few seconds longer than the sensor's instant IoT process. The batch import 50, 54 will not trigger a notification.

In either scenario the Event will be sent to the completion process then show up on the sequential Event Log to be immediately available for mapping, graphs and predictions.

Complete the Event—with Outside Data Sources and Processes 70

The event creation will trigger the process to complete the Event build 70. Notifications on automated events will be the first step and then the remaining Event data will be processed.

Once the build is completed the Event will be placed in the Event Log and available for mapping, graphs and predictions.

There are three outside data source processes to complete the Event build.

Get Location Data—Lookup and Update 74

A Location is a place on the property where the user would like to track deer movements and is defined by a single GPS. Locations are assigned location types that further define the location. Examples include cross trail, scrape, rub, bait pile, etc. These Location Types have an important function in mapping and prediction as described later in this document. A property has multiple locations and each location is assigned one or more devices 14.

The DeerMapper property administrator will build Location data in the following structure.

A Property is the selected land area where the user maps Trails and defines Locations. Devices 14 will be placed at Locations to capture the animal movements. The user will provide an address (or GPS) to represent the center of the property. When mapping is used the address will be at the center of the screen. Users can build multiple properties.

Trails are recorded and named on the Property using the DeerMapper mobile app. The user simply walks to the trail starting place and clicks begin. Then the user can walk until they reach the end of a trail, click end and name the trail.

By walking the deer trails with the DeerMapper mobile app the hunter can record those trails onto the property map.

When a deer grunt sound is heard on the hunter's phone, it means that the deer is on the move and the location and direction of travel can be seen live on the mobile app.

The mobile app is also used, in the woods, to place devices and guide the hunter to each location.

This is the base of information to determine where to place the Locations and devices.

Locations are places, defined by a single GPS, where the user would like to track animal movements. Most of the locations are along trails. Using the Web App, the user can place pins on the map strategically placed to track the animal movements. To perfect the GPS the user would then go into the property and stand at each location to mark the GPS by clicking the mobile phone. This adjusts the pinned Location to be exact.

Some of the Locations but will be placed because of what they represent (Location Types). They may be a cross trail, rub or scrape. They may be a SW corner of a field or entrance to a swamp.

When an upload is automated a notification is sent to the users mobile phone. The phone will make the animal sound and display the map showing where the animal is and an arrow to show the direction of travel.

This provides live scouting of each location without going to the property. The Location is the center of the mathematical analysis. Predictions, graphs and mapping are by Location.

Devices 14: Since devices 14 are temporary they are not used in analysis. They are simply assigned a location so that all data from that device 14 goes to the location. This gives the user the ability to move devices without effecting the location's historical data.

When devices 14 are placed at the location the user will aim the mobile phone to the target trail and click set. This will determine the direction to the trail and the GPS for the location. The device 14 will be 90 degrees from the trail so that the exact trail direction can be determined.

Users: Each Property Will have the Following User Types

Administrator—Has create, read, update and delete authority over all property data. Generally this is the land owner, researcher or guide.

Researcher—Can see all the Events, but only by county, and can see all events from other DeerMapper properties. This is for research and this user cannot edit any of the information. The analysis is done by location type by county.

Hunter—Can look at all the data by GPS on the property but cannot change any of it. This is for the hunter to do mapping, analysis and prediction only.

As soon as the Event is created the Complete the Event method 70 is activated. It will lookup the location 74 and capture the following data from the DeerMapper database.

Check that the device 14 matches the location and property of the import

Get the device trail direction and GPS from the Location table

Get the location type and outside influences from the Location table

This Location, User and Device data will be added to the Event

Use Image Processing to Determine the Animal Type and Direction of Travel 78

Image processing 78 will be done on the Image to determine the animal type and direction of travel.

As the image processing 78 is improved there will be other information like animal size and antler size. The image process will also populate the animal Tag if there are characteristics that are matching to identify the animal.

The animal Tag is a name given to an animal that frequents the devices and has distinguishing characteristics.

This data source will be continually improving and make Data Capture Method that much more accurate in the analysis.

The Animal Tag can be populated by the Image Processing 78 but will mainly be determined by the user manually adding the Tag to the Image in the DeerMapper application. The direction of travel can also be manually adjusted by the user.

Get Event Weather Data—Lookup and Update 82

Weather data is automatically retrieved from weather services like Accuweather or Aeris to populate the DeerMapper Event. There are many vendors who provide the same data types but vary in their accuracy of current and predictive weather. DeerMapper uses fifty different weather types determined by date, time and GPS location. The new weather services now include mathematical averages across several stations and satellite data. They provide accuracy sufficient for animal movement predictions.

Most influential weather data variables DeerMapper uses are Temperature, Wind Direction, Wind Speed, Wind Shift, Barometric pressure, Pressure Change, Visibility, Humidity, Sunrise, Sunset.

Calculations Used in Analysis:

Time before and after sunrise, Time before and after sunset, Time after wind switch, Scent factor and Other variables available in the database to use for future studies, such as: Dew Point, Snow total, Snow Depth, Rain, Rain total, Cloud cover, Sun illumination, Ultraviolet Index, Sun altitude, Sun azimuth, Cold Front, Warm front, Max Temperature, Min Temperature, Heating Degree Days, Cooling Degree Days, Veering Winds, Backing, Vorticity, Snow Advisory, Snow, Snow total, Snow Depth, Rain, Rain total, Rain last week, A Index, Artic Oscillation, Cloud cover, Sun illumination, Ultraviolet Index, Sun altitude, Sun azimuth, Astronomical Dawn, Astronomical Dusk, Declination, Insolation, Moon illumination, Moon rise, Moon set, Moon minor begin time, Moon minor end time, Moon major begin time, Moon major end time, Lunar phase, Lunar—current age, Lunar—percent full, Moon altitude, Moon azimuth, Length of day, Alberta Clipper, SWEAT, Lifted Index, Lapse Rate, K-Index, Convergence, Sound factor Wind, Sound factor Crunch, Sound factor, Scent factor, Scent factor Thermals, Time factors Morning, Time factors Mid-day, Time factors Evening, Time factors Dark, Wind Factor North (Azimuth 3150-00-450), Wind Factor East (Azimuth 460-1350), Wind Factor South (Azimuth 1360-2250), Wind Factor West (Azimuth 2260-3150), Wind Factor Shift, Wind Factor, Speed factor, Location factors, Food factor, Intrusion factor, Cover factor, Photoperiod, On the trail, Time after sunrise, Time before sunset, Time before wind switch, Time after wind switch, Rutting phase, Moon rating, Sound Range, Barometric change drop, Barometric change rise, Precipitation change drop, Precipitation change rise, Scent factor drop, Scent factor rise, and Temperature change drop.

The retrieval of the weather data completes the Event build. Adjustments can be made through manual editing of factors like Direction of Travel and Tag names.

DeerMapper's Mapping and Prediction 86

All of the Predictions and visuals defined in this section get their data from Deer Capture Method defined by this Patent. The value in Data Capture Method is that the data can be captured from any device 14 on the market. It is not exclusive to a single vendor or single type of data capturing device. Data Capture Method provides the only way for the 1.4 billion images captured per year to be in one structured database to be shared.

The following analysis can be done by property only by the property user. But the expanded value is that all properties can be shared by county with all DeerMapper Research users. The property GPS locations will be secured and cannot be seen by the researcher except by county. Location types will be the key replacing the actual Location GPS. This true shared database for Whitetail Biologists is also accessible by PowerBI, SAS or Tableau. With over 1.4 billion pictures taken per year they have a wealth of data in a common format.

DeerMapper Predictions are based on truth not theory or high-level movement analysis. Actual events and local facts are what make up the Event data. This is necessary to gain accurate predictions. Theory or experiences from the past hunts can be skewed by a food plot, cattle, logging, construction, hunting pressure, change in cover or habitat and many other local factors. The DeerMapper's method of data collection overcomes that by gathering local animal movements and placing them in a structured data format. Data Capture Method describes real movements and current movements.

Extensive mathematics is used on the server 90 to provide a simple interface of the odds to see deer at a specific location and time. Empirical statistical analysis is based on specific deer at a specific time and location. The math can be done at any date, number of days, location, and tag. It will be based on either sunrise or sunset movements.

Deer Predictions are based on either the next sunrise or sunset which is the main time deer move. The calculation is based on the forecasted weather at those points in time. This is the basis used for the search by a selected number of days of history with a selected Tag as to what happened under these conditions.

Figure 2:
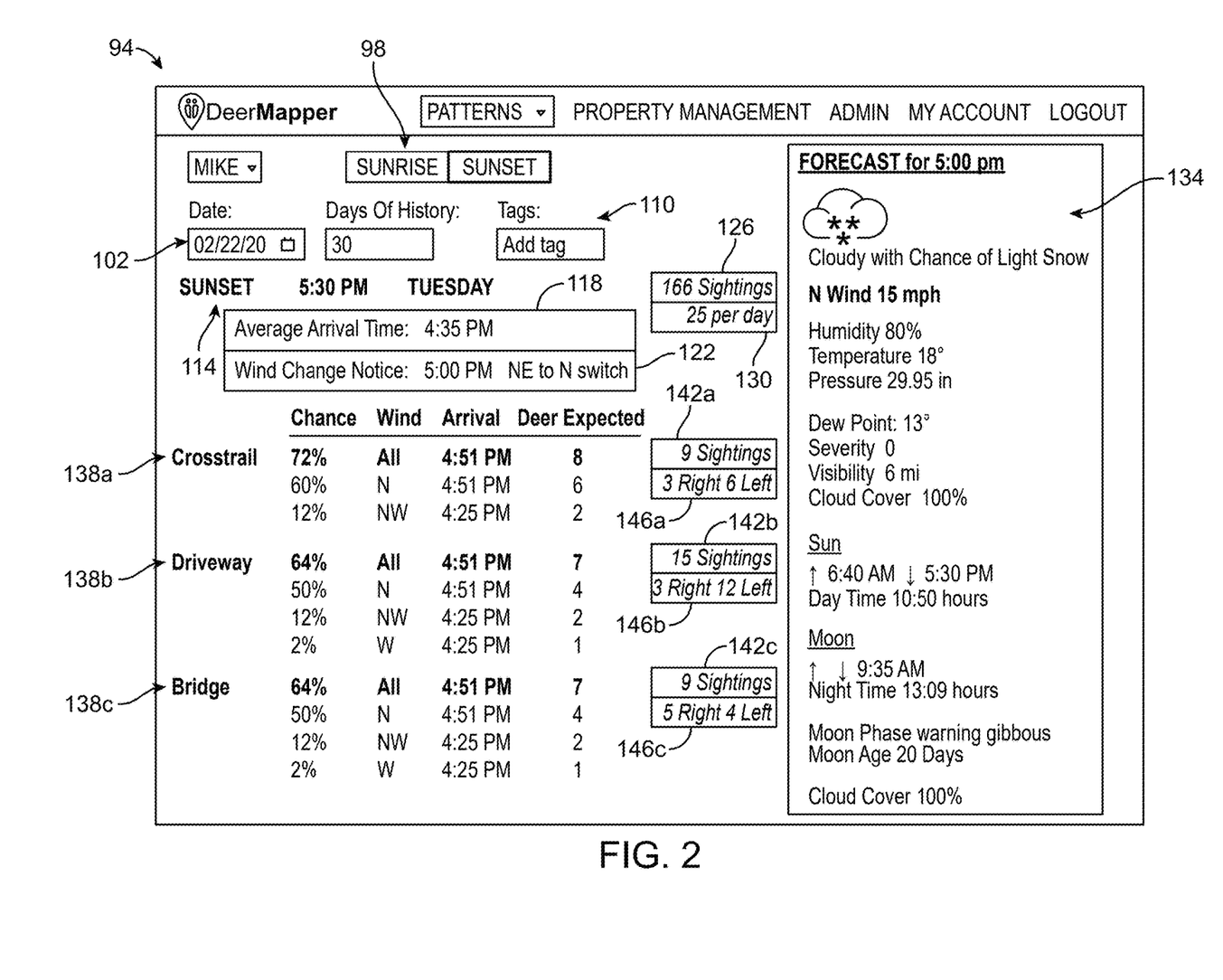
FIG. 2 is a prediction screen that illustrates a calculation of predictive factors for the method of FIG. 1.

FIG. 2 is a prediction screen 94 of a Property in Wisconsin that illustrates the extensive calculation of predictive factors.

The Selection criteria is by Property, Sunrise or Sunset 98, Date 102, Days of History 106 and the Tag 110.

The record set is selected by 2 hours before and after either sunset or sunrise.

The Time of the Sunset 114 for the selected days also compares that to the average time of arrival 118.

If there is a wind change in that day of at least 90 degrees it will show as a Wind Change Notice 122. For a deer hunter this is a time to go to this location because the deer will be on the move.

There will be listed the number of sightings (Events) 126 on this property during the selected time and the average number of sightings (Events or movements) 130 per day.

There is an extensive forecast 134 for the time selected showing cloud cover, wind, humidity, temperature, pressure, dew point, severity, visibility, cloud cover, Sun and moon details.

The top three locations 138a, 138b, 138c that have the highest probability will be listed showing the Location name, chance of a sighting, wind direction, arrival time, and the number of deer expected. This same information is listed for each location by the wind directions that had sightings.

Next to each of these locations shows the number of sightings 142a, 142b, 142c and how many were to the left and how many to the right 146a, 146b, 146c.

This screen is the first step to determine the best location with the highest probability to see the animals at the specified time.

There are several other visuals that combined provide the full DeerMapper Predictions.

Figure 3:
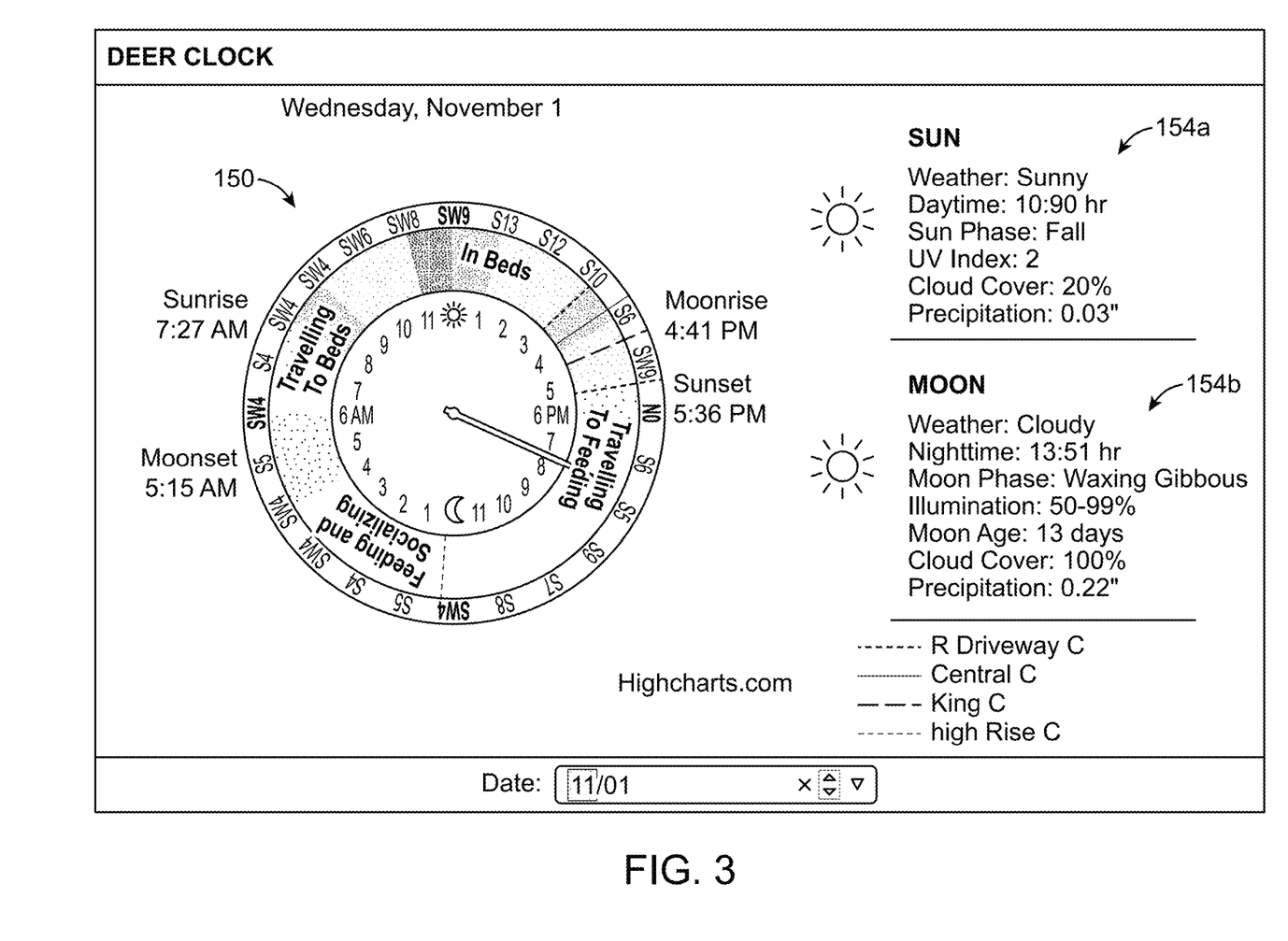
FIG. 3 is a schematic of a deer clock producible by the method of FIG. 1.

As illustrated in FIG. 3, a deer clock 150 shows a full 24 hour day of movement for a Property selectable for any day of data history. The locations may be color coded or texturized and show each movement with a line at the time of the movement. Full Sun and Moon information 154a, 154b will be displayed for the selected day.

Deer do not have clocks like humans. Their time is controlled by the sun and moon. This deer clock combines the human hours with the deer factors of time. Their time is based on sunrise, sunset, twilight and night. Moon phases are also shown. Colors will represent the cloud cover and moon phase at each hour. There will also be shown the wind direction. All these factors are important to understand visually where the deer are moving and when.

Figure 4:
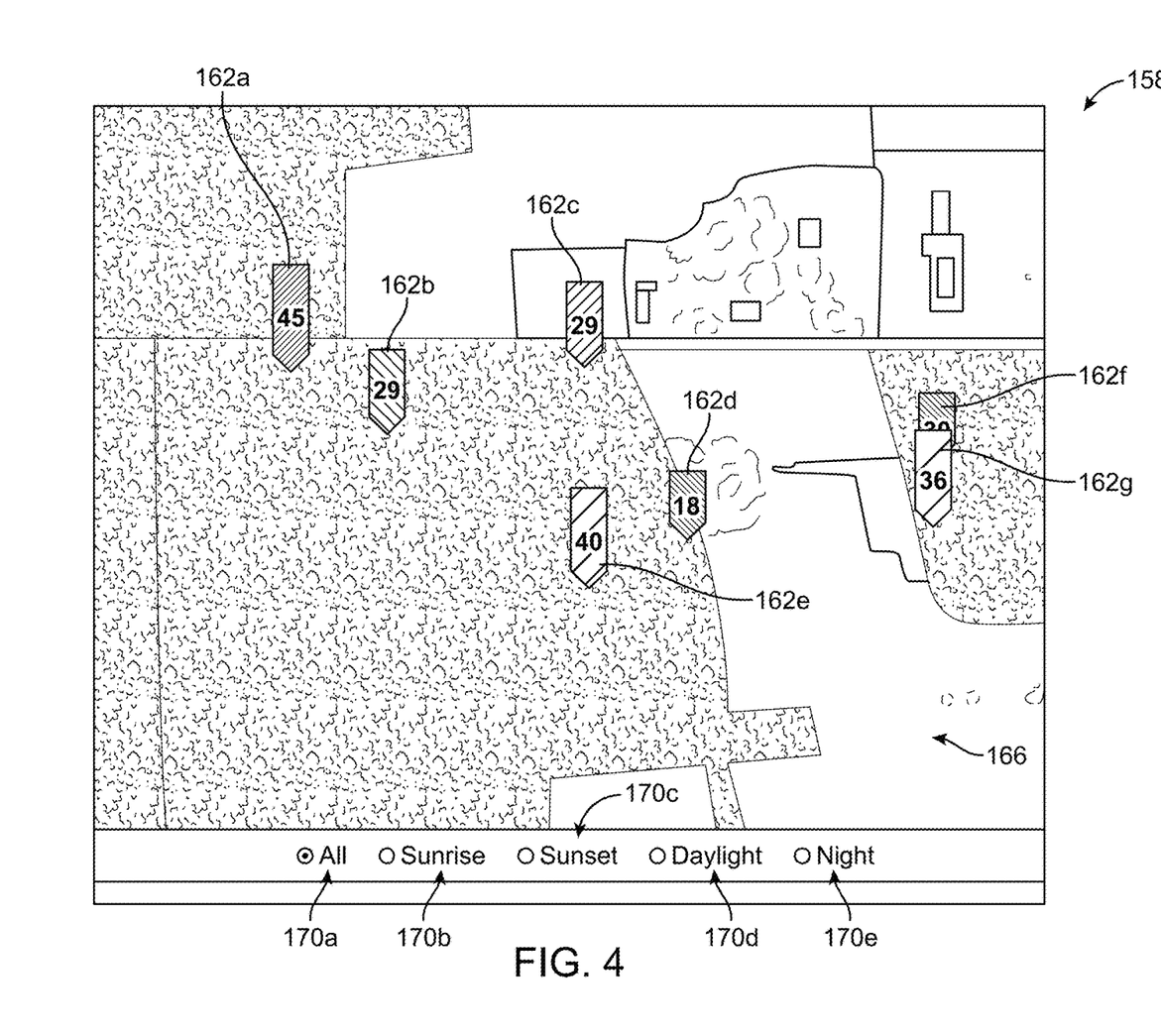
FIG. 4 is a schematic of a frequency chart producible by the method of FIG. 1.

With reference to FIG. 4, a frequency chart 158 shows each Location 162a-162g on the Property 166 with a colored bar sized by the number of sightings for the selected time. This visual provides a clear visual of where and at what frequency the deer are sighted at each location.

This chart can be seen by property and by All 170a, Sunrise 170b, Sunset 170c, Daylight 170d, or Night 170e.

Figure 5:
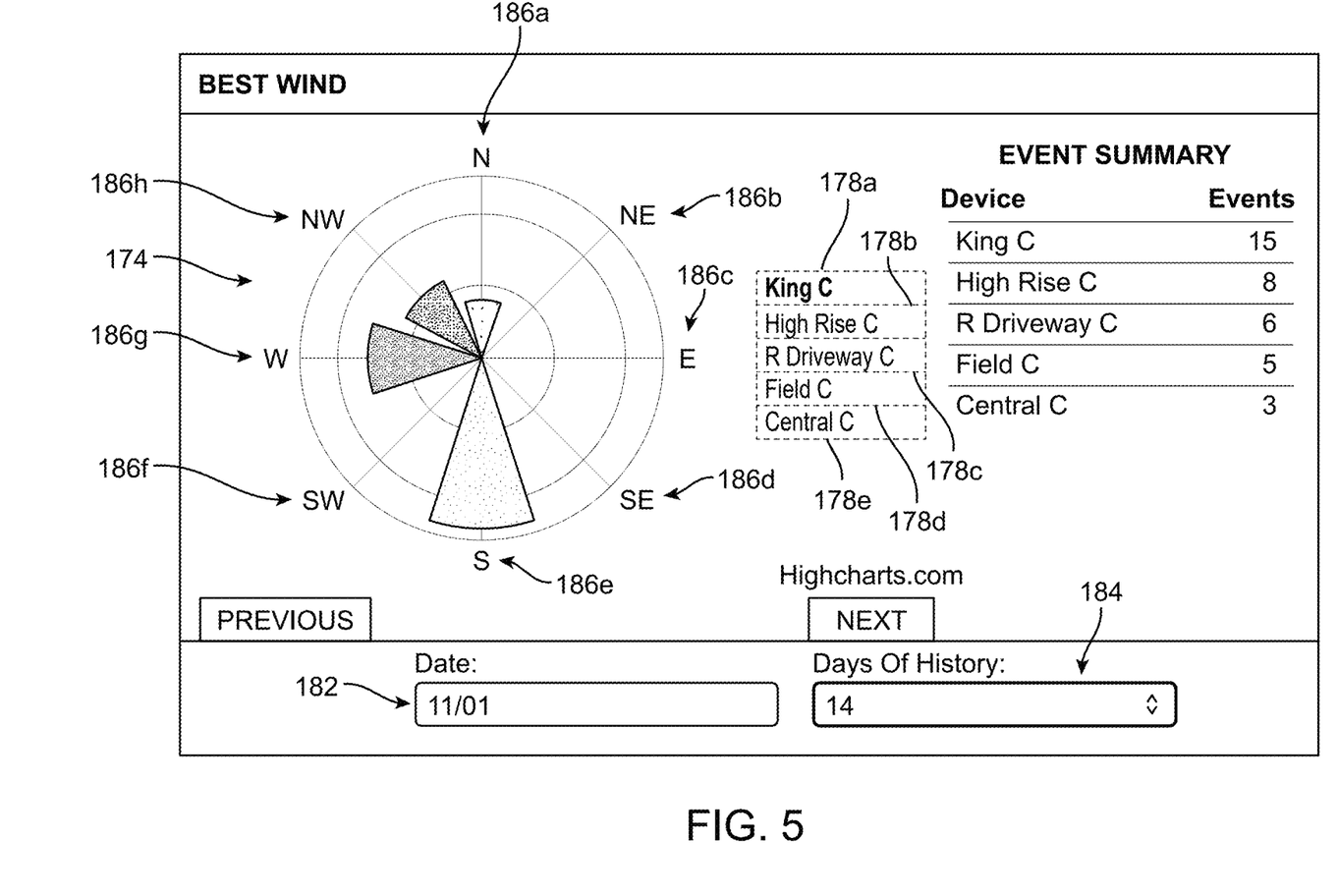
FIG. 5 is a schematic of a best wind chart producible by the method of FIG. 1.

FIG. 5 illustrates a Best Wind chart 174 that shows each Location 178a-178e on the Property and the number of events for the selected Date 182 and Days of History 184. The colored or texturized bars are sized by the number of sightings for the selected Location 178a, time and wind direction 186a-186h. This chart 174 provides a clear visual of where the deer are moving and at what time for each wind direction 186.

Figure 6:
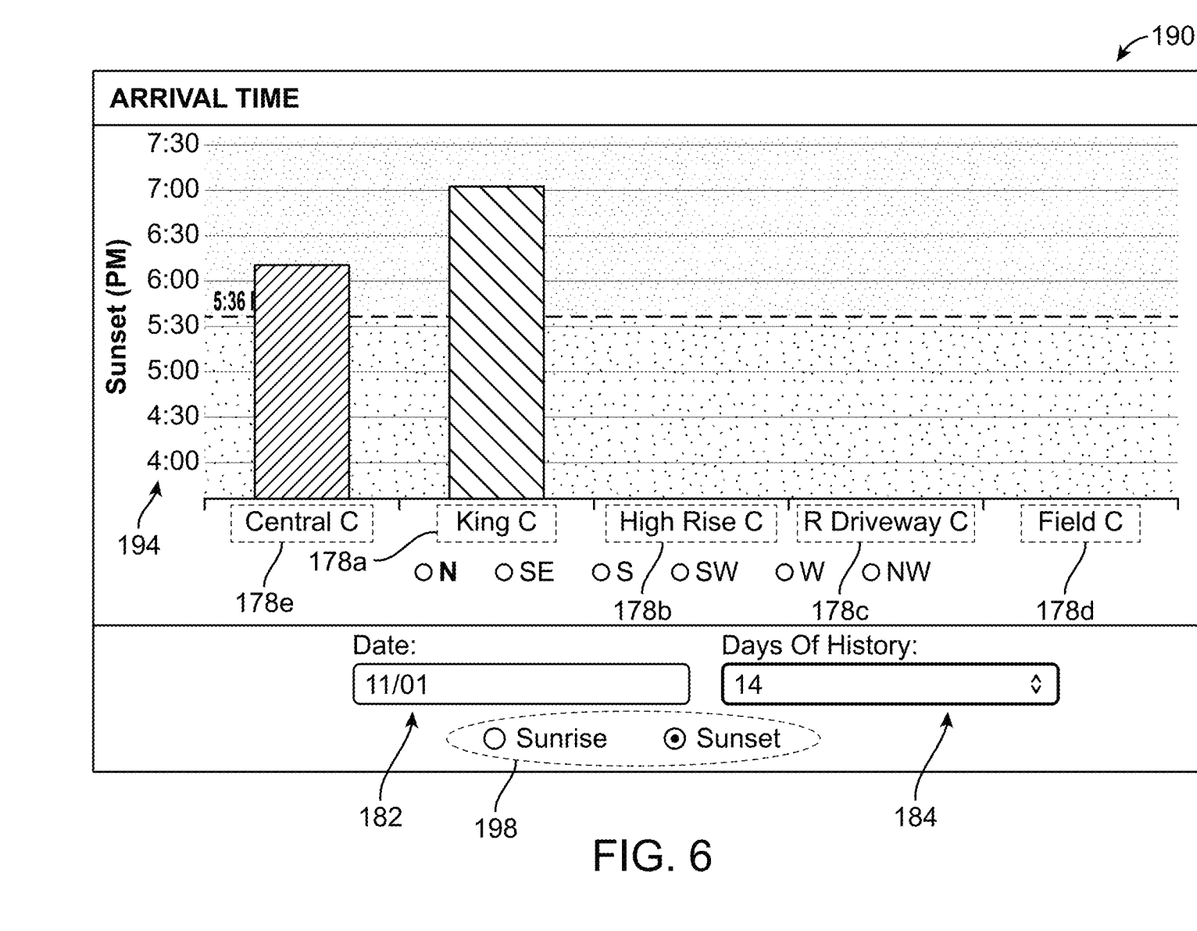
FIG. 6 is a schematic of an arrival time chart producible by the method of FIG. 1.

FIG. 6 illustrates an Arrival Time chart 190 that shows each Location 178a-178e on the Property and their average arrival time 194 based on the date 182, the number of days of history 184, wind direction (e.g., wind direction 186a-186h in FIG. 5) and sunrise or sunset 198. With these extensive selections the user can visualize when the deer will arrive.

Figure 7A:
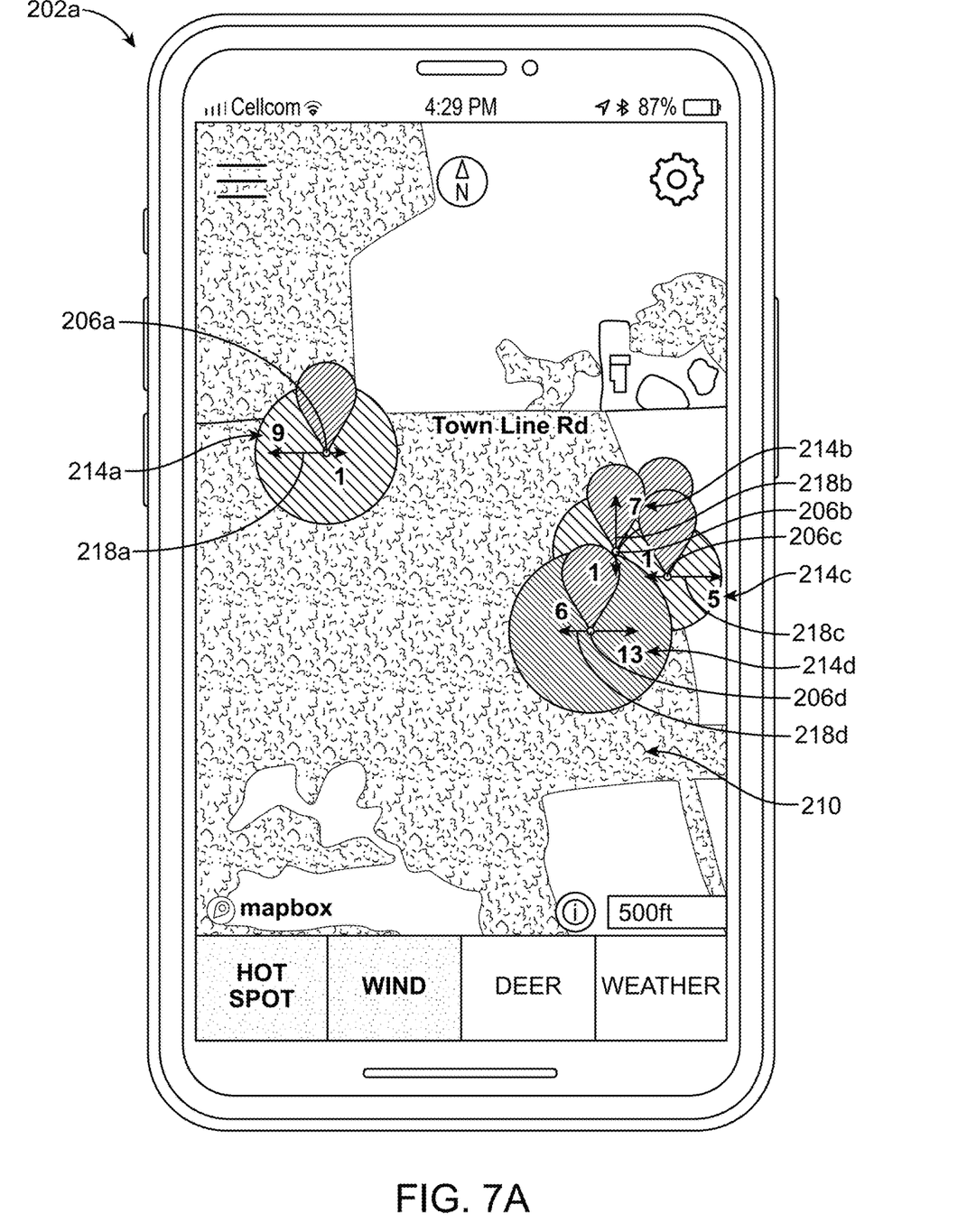
FIG. 7A is a schematic of a hot spot map producible by the method of FIG. 1.
Figure 7B:
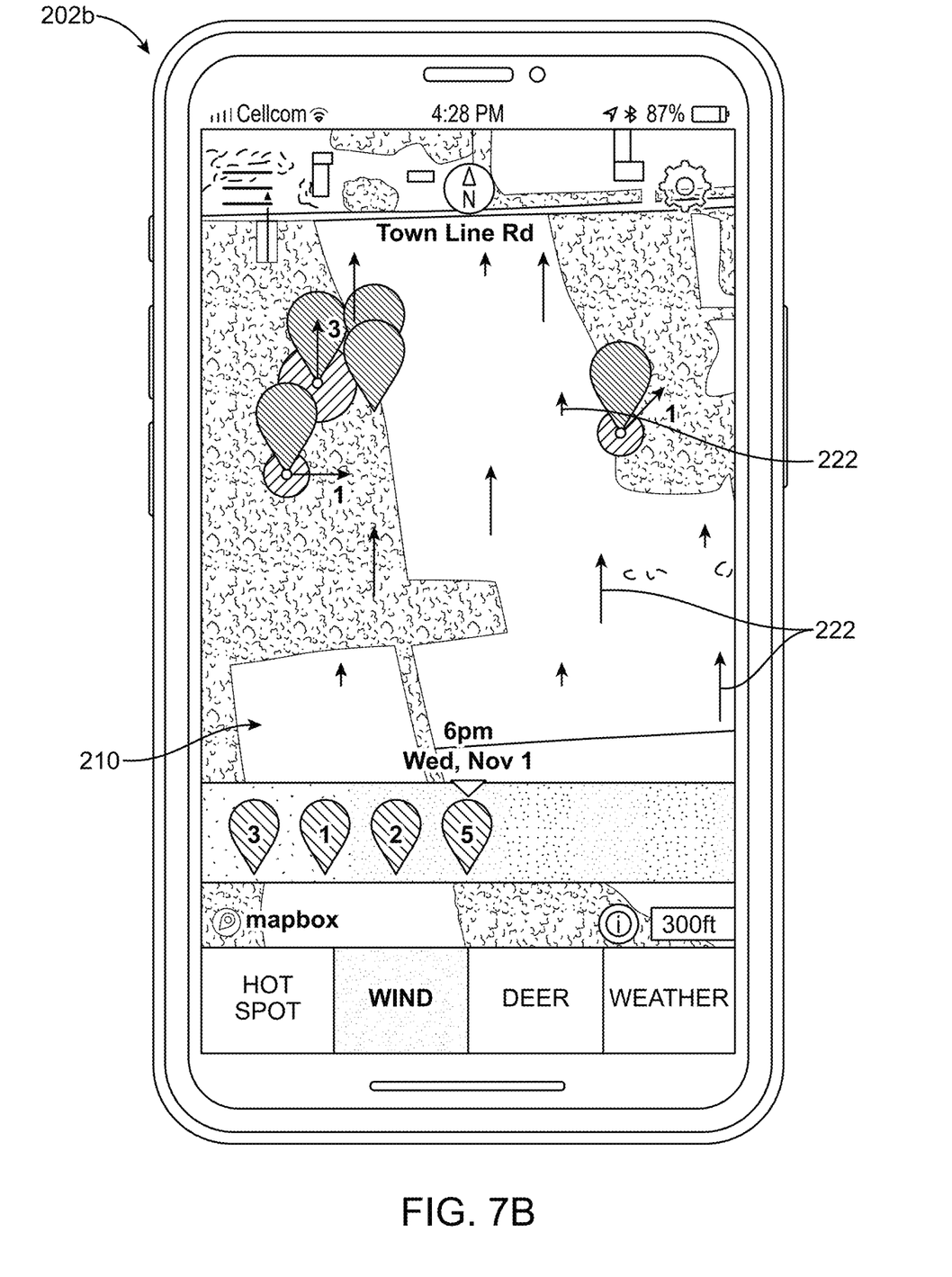
FIG. 7B is a schematic of another hot spot map producible by the method of FIG. 1.

FIGS. 7A and 7B illustrate Hot Spot maps 202a, 202B that show each Location 206a-206d on the Property 210 with the frequency 214a-214d and direction the deer moved 218a-218d by the hour and day or by the last 14 days. The user can scroll through the day to see how the deer were moving. The wind direction and wind speed 222 will also display as the user scrolls through the hours. For each hour the color or texture of the hour will show when it is dark, twilight or daylight.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:

1. A method for tracking game, via a mapping system, within a property, the property including a plurality of devices at different location types within the property, each of the devices configured to provide records of game, the method comprising:
    providing a location table that has a predefined list of the location types present within the property;
    receiving a first user input and a second user input;
    inserting each device into the location table based on the first user input;
    assigning a location type from the predefined list to each of the devices in the location table based on the second user input;
    receiving records of game from each of the devices;
    creating an event for each record of game including data mined from the record of game;
    retrieving, from the location table, the location type assigned to the device that provided the record of game;
    assigning the retrieved location type to the event; and
    predicting the probability of a game sighting at a specific time and location within the property based on a plurality of events.

2. The method of claim 1, wherein receiving records of game from each of the devices includes receiving a batch import upload in which a plurality of records is uploaded from a single device.

3. The method of claim 1, wherein receiving records of game from each of the devices includes receiving the records of game via transmission from the device when the device detects a game sighting.

4. The method of claim 1, further comprising
    assigning to each of the devices, in the location table, a GPS location according to the GPS location of the device;
    retrieving, from the location table, the GPS location that is assigned to the device that provided the record; and
    assigning the retrieved GPS location to the event.

5. The method of claim 4, further comprising
    retrieving, from a weather service, weather data according to the GPS location assigned to the event and a time that the record of game occurred; and
    assigning the retrieved weather data to the event.

6. The method of claim 1, further comprising displaying a prediction screen that shows a location type within the property having the highest probability of a game sighting and a predicted arrival time of game at the location type.

7. The method of claim 1, wherein the predefined list of the location types at least includes: a cross trail, a scrape, and a rub.

* * * * *